I. B. TURNER.
TRAIN SERVICE COUPLING.
APPLICATION FILED APR. 28, 1909.

948,150.

Patented Feb. 1, 1910.
7 SHEETS—SHEET 1.

Fig. 1

WITNESSES
S. M. Gallagher.
Francis A. Pocock

INVENTOR
Ira B. Turner
BY
ATTORNEY

I. B. TURNER.
TRAIN SERVICE COUPLING.
APPLICATION FILED APR. 28, 1909.

948,150.

Patented Feb. 1, 1910.
7 SHEETS—SHEET 2.

WITNESSES
S. M. Gallagher
Francis A'cock

INVENTOR
Ira B Turner
BY
W. Truston Williamson
ATTORNEY

I. B. TURNER.
TRAIN SERVICE COUPLING.
APPLICATION FILED APR. 28, 1909.

948,150.

Patented Feb. 1, 1910.
7 SHEETS—SHEET 4.

I. B. TURNER.
TRAIN SERVICE COUPLING.
APPLICATION FILED APR. 28, 1909.

948,150.

Patented Feb. 1, 1910.
7 SHEETS—SHEET 6.

Fig. 10.

WITNESSES
S. M. Gallagher
Francis A. Pocock

INVENTOR
Ira B Turner
BY

ATTORNEY

UNITED STATES PATENT OFFICE.

IRA B. TURNER, OF PHILADELPHIA, PENNSYLVANIA.

TRAIN-SERVICE COUPLING.

948,150.  Specification of Letters Patent.  Patented Feb. 1, 1910.

Application filed April 28, 1909. Serial No. 492,752.

*To all whom it may concern:*

Be it known that I, IRA B. TURNER, a citizen of the United States, residing at Philadelphia, in the county of Philadelphia and State of Pennsylvania, have invented a certain new and useful Improvement in Train-Service Couplers, of which the following is a specification.

My invention relates to a new and useful improvement in train service couplers, and has for its object to provide an exceedingly simple and effective device of this character, whereby the different service pipes of adjacent cars may be automatically coupled or uncoupled.

In coupling railway cars together it is customary to employ a flexible connection for each portion of the train service, such as air, steam, gas, etc., and when these connections are to be coupled it is necessary that a trainman go between the cars for such purpose. This manual operation of coupling the train service is objectionable however both on account of the delay and the time caused in effecting the same and also on account of the danger incurred by the trainman in going between the cars.

To avoid these objectionable features I have provided a coupler which will automatically assume a coupled position simultaneously with the coupling of the regular car couplers when the cars are brought together, and I have made provision for a longitudinal or forward and rearward movement, also horizontal and vertical movements somewhat in excess of that between the car couplers whereby they will positively automatically couple in any position in which the regular car couplers will couple and my couplers will also automatically uncouple should the car couplers be uncoupled either intentionally or accidentally.

In accordance with my present invention I have provided an automatic train service coupler, which, because of its shape will lock against horizontal or vertical movement relatively to one another and which is provided with a downwardly extending guide wing so constructed that when two of these guide wings come together they will be drawn to one side, but should the body of the coupler come in contact with the guide wing said guide wing will cause the coupler to move into its coupling position.

The gist of the invention is to provide train service couplers which are duplicates of one another so that they will be interchangeable and also to provide couplers which will automatically couple and lock when two cars come together and are automatically uncoupled when the same cars are discontinued.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

As the construction and operation of each of the companion couplers illustrated in the drawings is substantially identical, the further detail description of one will be applicable to both.

In carrying out my invention as here embodied, A represents brackets, by which the car coupler B of a car may be connected to said car. To these brackets are attached the service coupling brackets C, or if found desirable they may be formed with the first named brackets. In the last named brackets are formed vertical slots D, through which passes the shank E, the outer end of which is bent on its axial line at right angles, as indicated by F, and in this end is formed a bolt receiving opening G.

H is a pin placed in proximity to the forward end of the shank E, and between this pin and the forward bracket C is placed a coil spring I, which is coiled about the shank E, so as to normally hold the shank forward. In the rear end of the shank is placed another pin J which will prevent said shank from pulling out of the vertical slot D in the rear bracket C. Coiled about the rear bracket is a coil spring K, the lower end of which rests against the upper surface of the shank E, and the upper end rests against a suitable stop L placed in the bracket, and this spring normally holds the rear end of the shank E downward.

Figure 1:
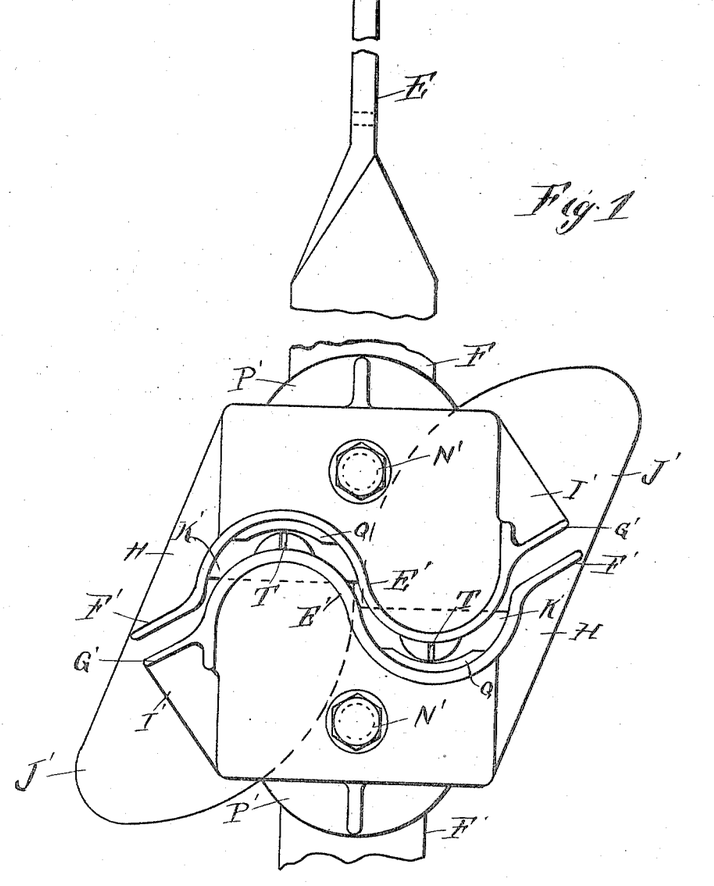
Figure 1 is a plan view of two couplers made in accordance with my improvement in the position they assume just before the final coupling.
Figure 2:
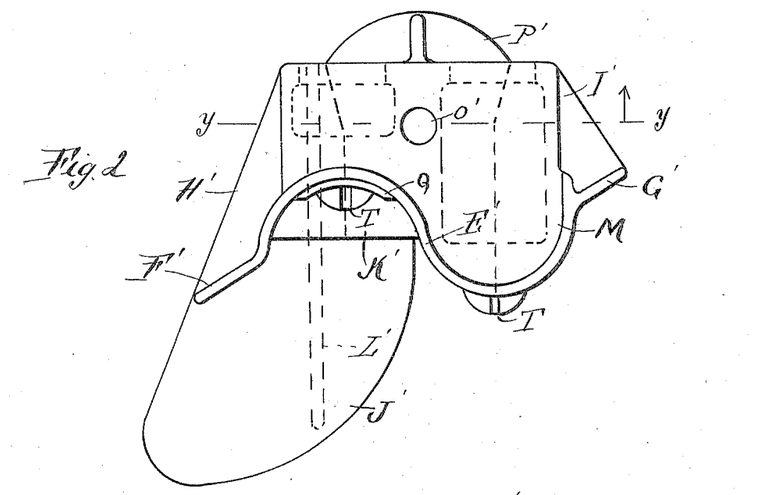
Fig. 2, a similar view of one of the couplers showing the shank removed.
Figure 3:
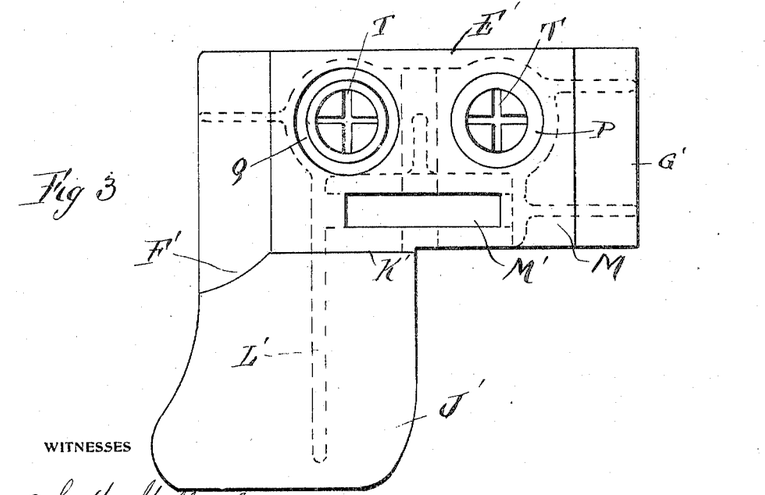
Fig. 3, a front elevation thereof.
Figures 4, 5:
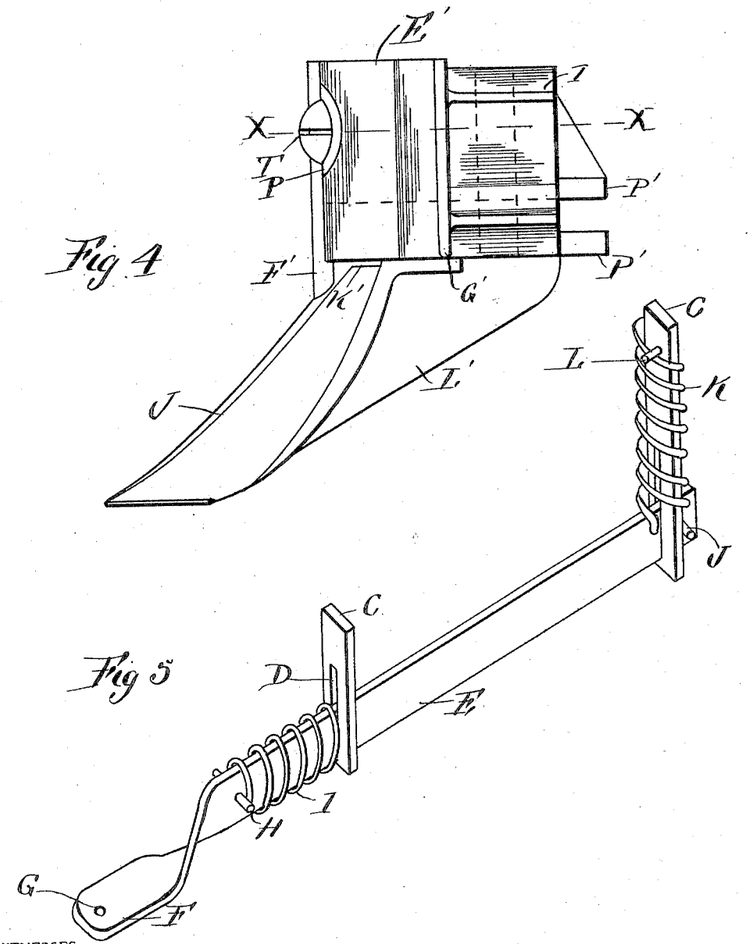
Fig. 4, a side elevation.
Fig. 5, a perspective view of the shank showing how it is attached to the cars.
Figure 6:
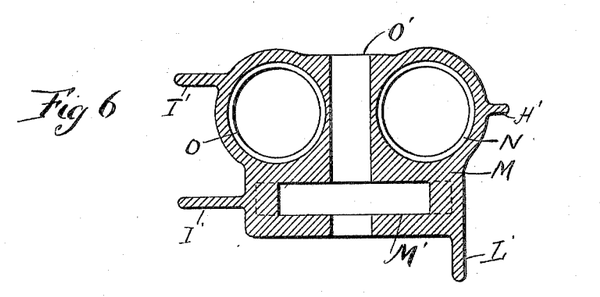
Fig. 6, a section at the line $y$—$y$ of Fig. 2 looking in the direction of the arrows.
Figure 7:
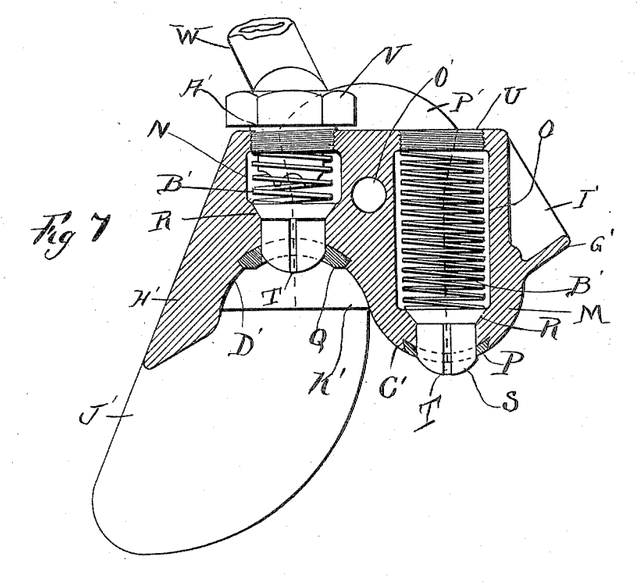
Fig. 7, a section at the line $x$—$x$ of Fig. 4 looking downward.
Figures 8, 9:
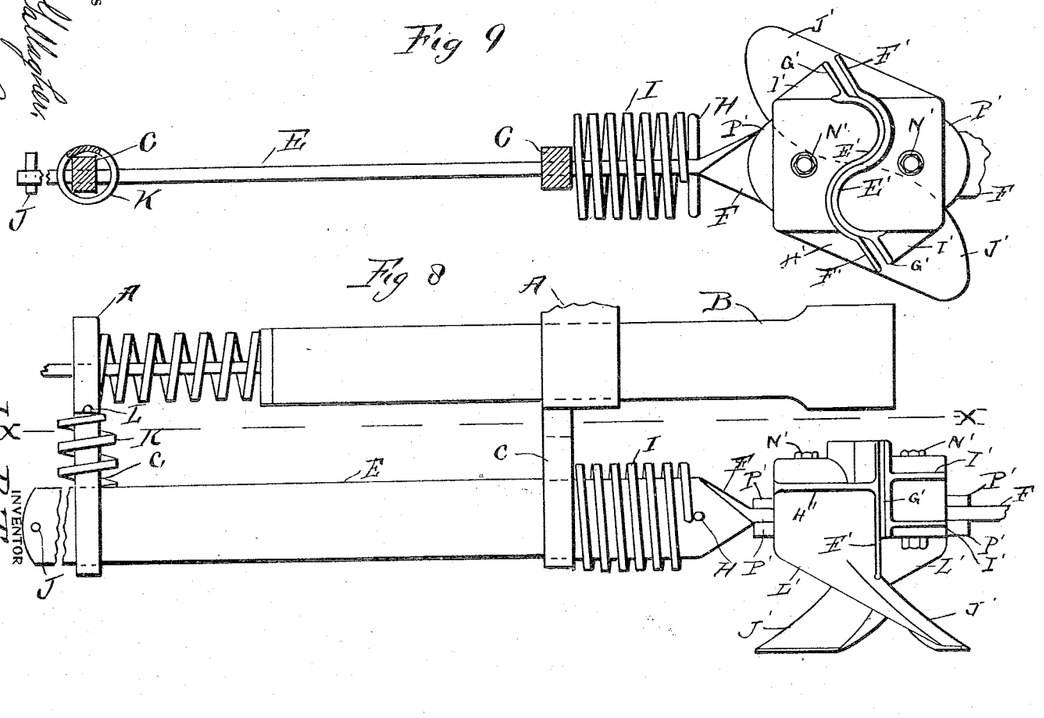
Fig. 8, a side elevation on a reduced scale of two couplers coupled together showing the relation to one of the train couplers.
Fig. 9, a section at the line $x$—$x$ of Fig. 8 looking downward.
Figure 10:
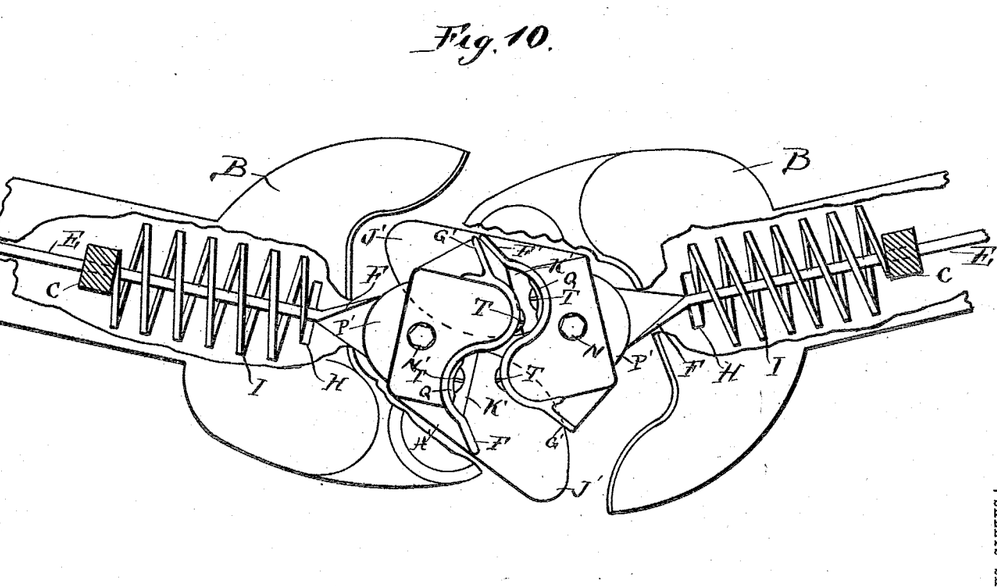
Fig. 10, a plan view of two couplers coupling on a curve, the car couplers being broken away to more plainly show the construction, and Fig. 11, a modified form of my invention showing the coupler built up so as to provide for an extra number of service pipes.

Supported on the outer end of the shank E is my improved train service coupler, composed of a head M, which is provided with a number of passages or conduits N and O, the orifices of which lie in a horizontal plane, more clearly shown in Fig. 3, and provided with rubber gaskets P and Q, the gasket P being here shown as flush with the coupler face and the gasket Q shown as extending beyond said face, these gaskets being used for effecting the proper coupling of the conduits of this with a companion coupler head when brought into coupling engagement therewith. On the inner walls of the conduits N and O, at their outer ends are provided the ground valve seats R, against which seat the valves S, their outer ends extending beyond the faces of the coupler and are formed by producing ribs T at right angles to one another. The rear ends of the conduits N and O are provided with threads U into which are threaded the couplings V of the train service pipes W. The inner end of these couplings may be extended, as indicated by A' so that they will pass into the conduits N and O thereby acting as stops for the valves S. Between the couplings V and the valves S are placed coil springs B' which normally hold the valves against their seats, so that when two of the couplers are drawn apart the passages will be automatically closed, shutting off the steam, gas, water, etc.

The coupler head is formed with a convex face C' and a concaved face D' so that as two companion couplers come into the coupling position the convex face of one will enter the concaved face of the other, and vice versa.

The faces of the coupler extend above the head M, so as to form a flange E' and said coupler is also provided with a forward sidewise extending flange F' and a rearward sidewise extending flange G' which are braced by the ribs H' and I' extending from the outer ends of the flanges F' and G' to the head M of the coupler.

J' denotes the guide wing which extends downward from one side of the coupler head and forward of the faces and is so constructed that should the guide wing of the companion coupler come in contact therewith it would cause said guide wing to be drawn off to one side so that the concaved face of one coupler would come in alinement with the convex face of the opposite coupler, but should the lower edge of the coupler head come in contact with said guide wing it would be caused to ride upward on said guide wing until the parts are in alinement, the same as when one guide wing comes in contact with the other. At the upper end of this guide wing and below the concaved face of the coupler head is formed a seat K', the face of which is in alinement with the lower surface of the coupler head or slightly below it, so as to leave room for a certain amount of play when the coupling movement is taking place. The guide wing J' is braced by a suitable rib L' so as to relieve a portion of the strain brought to bear thereon when coupling.

The coupler head M is provided with a slot M' beneath the conduits N and O and in this extends the end F of the shank E and is held therein by a bolt N' passing through the opening O' and the bolt receiving opening G in the end of the shank, said opening O' being formed at right angles to the slot M'. At the rear end of the coupler head both above and below the slot M' are formed the extensions P' so as to provide a greater surface for resting against the shank E.

Figure 11:
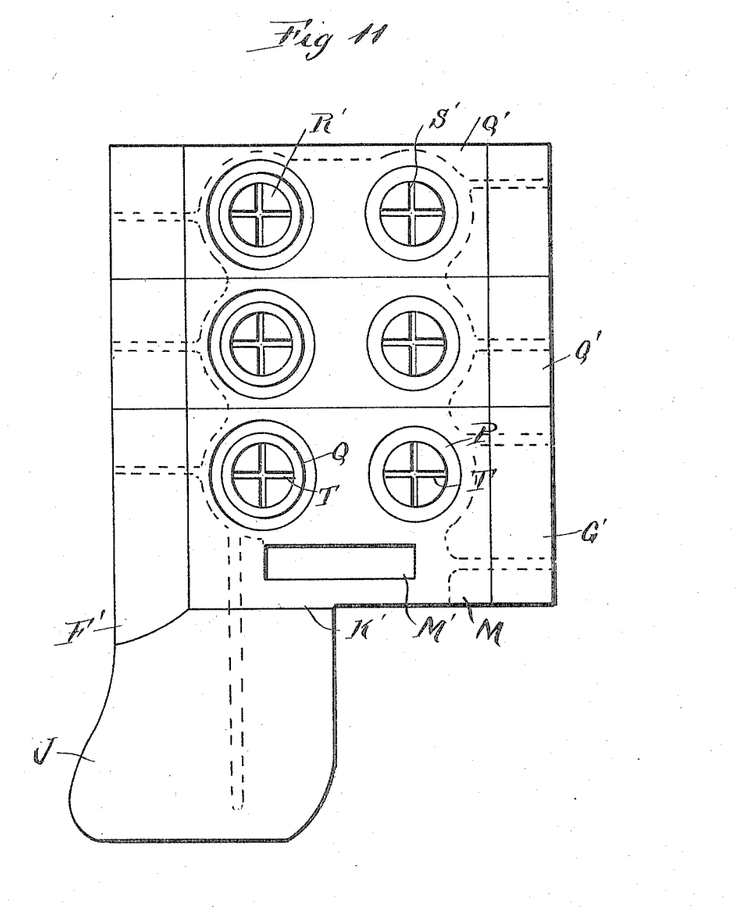

In Fig. 11 I have shown a modified form of my device in which I take a number of sections Q' which are similar to the coupler head proper, having conduits R' and S' similar to the conduits N and O in the coupler head, and to the rear of each of these is attached a service pipe and in the forward end are mounted valves for closing the conduits. These sections as needed are placed upon top of the coupler head and attached thereto in some suitable manner. If found desirable these sections may be cast with the coupler proper instead of being mounted thereon, after the casting has been made.

The operation of the train service coupler is as follows:—When two trains equipped with the coupler are brought together, an automatic coupling of both the car couplers and the train service couplers is effected when the train service couplers are thus brought into coupling engagement, the adjacent faces of the coupler heads M will be maintained in close engagement with each other by the coil springs I, so as to assure a tight joint between the rubber gaskets P and Q at the orifices of the corresponding conduits carried by each coupler, at the same time the convex portion C' of one coupler fitting in the concave portion D' of the adjacent coupler when the pressure of the springs I behind the couplers will prevent said couplers from moving horizontally, and as the seat K' of each coupler is beneath the convex portion of the adjacent coupler it will prevent said coupler heads from moving in a vertical direction with relation to one another. When two cars are being coupled on a curve the rearwardly sidewise extending flange G' of one coupler will come in contact with the forwardly sidewise extending flange F' of the adjacent coupler, which will cause the coupler heads to swing upon the bolts N' causing the passages N and O of one coupler to line up with the corresponding passages in the adjacent coupler, and as the couplers are brought closer together the gaskets will come in contact with one another forming a tight closure, at the same time the valves S will come in contact with one another and will be pushed inward against the action of the springs A' and B' thus opening the passage ways, and in order that both valves shall open, I provide a stop back of them so that when one has come in contact with this stop the adjacent valve must open because of the pressure against it. When two cars, one of which is loaded, and the other empty are being coupled, the train service couplers will come together, one higher than the other, at which time the under side of the guide wing J' on the higher coupler will come in contact with the convex face of the guide wing on the lower coupler and the pressure behind them will cause the higher coupler to slide off to one side until the parts are in alinement, at which time the couplers will come together in the manner desired. Should this same character of coupling operation be taking place and the lower edge of the convex face of the coupler head come in contact with the guide wing of the adjacent coupler head, said guide wing will cause the adjacent coupler head to ride upon it until said adjacent coupler had taken its position, as hereinbefore described, and no matter at what point on the guide wing said convex face strikes it is bound to take its position, as the curve of said guide wing leads to a common center which is the seat K'.

The vertical movements of the couplers are obtained through the medium of the shank E mounted in the slotted brackets C, for when an upward movement is desired the forward end of the shank will move upward in the slot D of the forward bracket C and when a downward movement is desired, the rear end of the shank E will rise upward in the slot D, in the rear bracket C against the action of the spring K, using the forward bracket C as a fulcrum.

Of course I do not wish to be limited to the exact details of construction here shown as these may be varied within the limits of the appended claims without departing from the spirit of my invention.

Having thus fully described my invention, what I claim as new and useful, is—

1. In a train service coupler, a coupler head provided with a concave and a convex face, each having a valve controlled conduit leading from said concave and convex faces rearwardly through the coupler, a downwardly forwardly extending guide wing, and means other than the guide wing for alining the concave face of one coupler with the convex face of the co-acting coupler.

2. In a train service coupler, a coupler head having a concave and a convex face, each having a conduit leading from said concave and convex faces, a valve seat formed in the walls of the forward ends of said conduits, resilient means for normally holding said valves against their seats, a forwardly downwardly extending guide wing, and means other than the guide wing for assisting in alining the concave face of one coupler with the convex face of the co-acting coupler.

3. In a train service coupler, a coupler head having a concave and a convex face, each having a conduit leading therefrom rearward through the coupler, each of said conduits having a valve seat formed in the walls of their forward ends, valves, coil springs for holding said valves against their seats, stops for limiting the movement of the valves, and a forwardly downwardly extending guide wing, the outer face of which is formed to lead to a common center at the upper portion thereof.

4. In a train service coupler, a coupler head having concave and convex faces, each having a valve controlled conduit leading therefrom rearwardly through the coupler, and a downwardly forwardly extending guide wing.

5. In a train service coupler, a coupler head provided with a concave and a convex face, each having a conduit respectively leading from said convex and said concave portions rearwardly through the coupler, and gaskets placed in the orifices of said conduits.

6. In a train service coupler, a coupler head provided with a concave and a convex face, each having a conduit respectively leading from said convex and said concave portions rearwardly through the coupler, gaskets placed in the orifices of said conduits, and a downwardly forwardly extending guide wing formed with one side of the coupler head.

7. In a train service coupler, a coupler head provided with a concave and a convex face, each having a conduit respectively leading from said convex and said concave portions rearwardly through the coupler, gaskets placed in the orifices of said conduits, a downwardly forwardly extending guide wing formed with one side of the coupler head, and a seat formed at the upper portion of said guide wing.

8. In a train service coupler, a coupler head having concave and convex portions and provided with conduits, a rearwardly sidewise extending flange formed with one side of said coupler head, and a forwardly sidewise extending flange formed with the opposite side of said head.

9. In a train service coupler, a coupler head having concave and convex portions and provided with conduits, a rearwardly sidewise extending flange formed with one side of said coupler head, ribs for strengthening said flange, and a forwardly sidewise extending flange formed with the head.

10. In a train service coupler, a coupler head having concave and convex portions and provided with conduits, a rearwardly sidewise extending flange formed with one side of said coupler head, ribs for strengthening said flange, a forwardly sidewise extending flange formed with the head, and a downwardly forwardly extending guide wing.

11. In a train service coupler, a coupler head provided with a concave and a convex portion and having conduits and a slot passing entirely through the head, and a shank passing into said slot, for the purpose set forth.

12. In a train service coupler, a coupler head provided with a concave and a convex portion and having conduits and a slot passing entirely through the head, a shank passing into said slot, and means for pivoting said head to the shank.

13. In a train service coupler, a coupler head having a concave and convex face and provided with a slot and bolt receiving opening, a forwardly downwardly extending guide-wing, a shank, the outer end of which is bent on its axis at right angles, provided with a bolt receiving opening, and a bolt for pivoting the coupler head to the shank.

14. In combination, forward and rear brackets having slots formed therein, a shank, the forward end of which is bent on its axis at right angles and having a bolt receiving opening therein, a pin passing through the shank in proximity to its forward end, a spiral spring coiled about the shank, one end of which rests against the forward bracket, the other against the pin, another pin passing through the shank to the rear of the rear bracket, a spiral spring coiled about the rear bracket, the lower end of which rests against the shank, means for holding the upper end of said springs in position, and a coupler head having a concave and convex portion and a downwardly forwardly extending guide wing.

15. In combination, forward and rear brackets having slots formed therein, a shank, the forward end of which is bent on its axis at right angles and having a bolt receiving opening therein, a pin passing through the shank in proximity to its forward end, a spiral spring coiled about the shank, one end of which rests against the forward bracket, the other against the pin, another pin passing through the shank to the rear of the rear bracket, a spiral spring coiled about the rear bracket, the lower end of which rests against the shank, means for holding the upper end of said springs in position, a coupler head provided with a concave and convex portion, said concave and convex portion extending upwardly to form a flange, said coupler head provided with conduits, a slot and bolt receiving opening, the walls at the forward end of said conduits being formed to produce valve seats and having threads formed in their rear ends, valves mounted in said conduits, stops for limiting the movement of said valves, gaskets mounted in the orifices of said conduits, connections for connecting the conduits with the train service pipes, a bolt passing through the bolt receiving opening in the head and the one in the shank for pivoting said head to said shank, extensions formed with the rear of said head above and below the slot, a rearwardly sidewise extending flange, ribs for bracing the same, a forwardly sidewise extending flange formed with the opposite side of said head, a downwardly forwardly extending guide wing formed with one side of the head, the outer face of said guide wing being so constructed as to lead to a common center, a seat formed at the upper end of said guide wing below the concave portion, and a rib for strengthening said guide wing.

16. In a train service coupler, a coupler head having concave and convex faces, each provided with a valve controlled conduit leading therefrom, rearwardly through the coupler, a downwardly forwardly extending guide wing, and a seat formed with the upper portion of said guide wing, acting as a lock against vertical movement when two of the couplers are in engagement, as specified.

17. In a train service coupler, a coupler head provided with concave and convex contact faces, from each of which a conduit leads, valves operating in said conduits, yielding means for maintaining said valves in a normal position, and means formed with said head for alining the concave portion of one coupler with the convex portion of the opposite coupler.

18. A coupler consisting of two duplicate coupler members, each member comprising a coupler head having a concave and a convex face, a conduit leading to each of said faces, valves operating in said conduits, means for maintaining the valves in normal position, means for limiting their movements in one direction and guide wings formed with the coupler heads, coacting to bring the concave face of one member in contact with the convex face of the opposite member.

19. A coupler consisting of duplicate coupling members, each comprising a coupler head yielding when supported and having a concave and a convex contact face, a conduit leading to each of said faces, valves for closing said conduits, yielding means for maintaining the valves in normal position and a forwardly extending guide wing secured to each member and co-acting with the guide wing of the opposite member to accurately aline the concave face of one head with the convex face of the opposite head.

20. In a coupler, a support yieldingly mounted to permit vertical and longitudinal movements thereof, a coupler head carried by said support and having concave and convex faces, a conduit leading to each of said faces, valves for closing said conduits, yielding means for maintaining the valves normally closed and permitting them to open when the contact face of one coupler head comes into proximity to the convex contact face of another coupler head and means formed with said head co-acting with similar means on the duplicate coupler head for alining the concave face of one head with the convex face of the opposite head.

21. In a train service coupler, a coupler head having concave and convex contact faces, a conduit leading to each of said faces, means formed with the sides of said head for assisting in the alinement of the convex face of one head with the concave face of the opposite head.

22. In a train service coupler, a coupler head having a concave and a convex contact face, a conduit leading to each of said faces, spring actuated valves for normally closing said conduits and means formed with the sides of the coupler head for assisting in the alinement of a pair of couplers when brought together at an angle.

23. A coupler consisting of duplicate coupler members, each comprising a coupler head having a concave and convex face, a conduit leading to each of said faces, valves situated in said conduits, yielding means for maintaining the valves in normal position, and flanges formed with the sides of the heads, for assisting in alining the contact faces.

24. A coupler consisting of duplicate coupler members each comprising a coupler head having a concave and convex face, a conduit leading to each of said faces, valves situated in said conduits, yielding means for maintaining the valves in normal position, flanges formed with the sides of the heads for assisting in alining the contact faces, and means for strengthening said flanges.

25. A coupler consisting of duplicate coupler members, each comprising a coupler head having a concave and convex face, a conduit leading to each of said faces, valves situated in said conduits, yielding means for maintaining the valves in normal position, flanges formed with the sides of the heads for assiting in alining the contact faces, and ribs for strengthening said flanges.

26. In a train service coupler, a coupler head having concave and convex contact faces, a conduit leading to each of said faces, spring actuated valves for normally closing the conduits, means for limiting the rearward movement of said valves, a rearwardly and sidewise extending flange formed with the one side of said coupler head and a forwardly sidewise extending flange formed with the opposite side of said head.

27. In a train service coupler, a coupler head having concave and convex contact faces, a conduit leading to each of said faces, spring actuated valves for normally closing the conduits, means for limiting the rearward movement of said valves, a rearwardly and sidewise-extending flange formed with one side of said coupler head, a forwardly sidewise extending flange formed with the opposite side of said head, and a downwardly and forwardly extending guide wing formed with the lower portion of the coupler head.

28. In a train service coupler, a coupler head having concave and convex contact faces, a conduit leading to each of said faces, spring actuated valves for normally closing the conduits, means for limiting the rearward movement of said valves, a rearwardly and side-wise extending flange formed with one side of said coupler head, a forwardly sidewise extending flange formed with the opposite side of said head, and a downwardly and forwardly extending guide wing formed with the lower portion of the coupler head, the outer face of which is so curved as to lead to a common center at the upper portion thereof.

29. In a train service coupler, a coupler head having concave and convex contact faces, a conduit leading from each of said faces, spring actuated valves for normally closing the conduits, means for limiting the rearward movement of said valves, a rearwardly and sidewise extending flange formed with one side of said coupler head a forwardly sidewise extending flange formed with the opposite side of said head, a guide wing formed with the head and a seat formed at the top of said guide wing.

30. In a train service coupler, a coupler head having concave and convex contact faces, a conduit leading from each of said faces, spring actuated valves for normally closing the conduits, means for limiting the rearward movement of said valves, a rearwardly and sidewise extending flange formed with one side of said coupler head and means formed with the head at the top of the guide wing to prevent longitudinal movement of the coupler heads after they are coupled.

In testimony whereof, I have hereunto affixed my signature in the presence of two subscribing witnesses.

IRA B. TURNER.

Witnesses:
ROBERT TURNER,
JOHN R. THOMAS.